US012296337B2

(12) United States Patent
Gao et al.

(10) Patent No.: US 12,296,337 B2
(45) Date of Patent: May 13, 2025

(54) ELECTROOSMOTIC MICROPUMP APPARATUS AND ELECTROOSMOTIC MICROPUMP APPARATUS GROUP

(71) Applicants: HANGZHOU WEIMING XINKE TECHNOLOGY CO., LTD, Zhejiang (CN); ADVANCED INSTITUTE OF INFORMATION TECHNOLOGY (AIIT), PEKING UNIVERSITY, Zhejiang (CN)

(72) Inventors: Meng Gao, Zhejiang (CN); Le Ye, Zhejiang (CN)

(73) Assignees: HANGZHOU WEIMING XINKE TECHNOLOGY CO., LTD, Zhejiang (CN); ADVANCED INSTITUTE OF INFORMATION TECHNOLOGY (AIIT)), PEKING UNIVERSITY, Zhejiang (CN)

( * ) Notice: Subject to any disclaimer, the term of this patent is extended or adjusted under 35 U.S.C. 154(b) by 718 days.

(21) Appl. No.: 17/642,398

(22) PCT Filed: Sep. 9, 2020

(86) PCT No.: PCT/CN2020/114139
§ 371 (c)(1),
(2) Date: Mar. 11, 2022

(87) PCT Pub. No.: WO2021/047529
PCT Pub. Date: Mar. 18, 2021

(65) Prior Publication Data
US 2022/0331794 A1 Oct. 20, 2022

(30) Foreign Application Priority Data
Sep. 11, 2019 (CN) ......................... 201910860201.1

(51) Int. Cl.
*B01L 3/00* (2006.01)

(52) U.S. Cl.
CPC ... *B01L 3/50273* (2013.01); *B01L 2300/0645* (2013.01); *B01L 2300/161* (2013.01); *B01L 2400/0418* (2013.01)

(58) Field of Classification Search
CPC ......... B01L 3/50273; B01L 2300/0645; B01L 2300/161; B01L 2400/0418
See application file for complete search history.

(56) References Cited

U.S. PATENT DOCUMENTS 7,105,382 B2 * 9/2006 Myers ................... H01L 23/473 257/E23.098
7,316,543 B2 * 1/2008 Goodson ............... F04B 19/006 204/600
(Continued)

FOREIGN PATENT DOCUMENTS

CN 101427368 A 5/2009
CN 203090949 U 7/2013
(Continued)

OTHER PUBLICATIONS

Liu, et al., "Review on Micro Pump for Microfluidics", Journal of Bejing University of Technology, Jun. 2018, vol. 44, No. 6, 13 pages.
(Continued)

*Primary Examiner* — Brian J. Sines
(74) *Attorney, Agent, or Firm* — Muncy, Geissler, Olds & Lowe, P.C.

(57) ABSTRACT

The present invention relates to the technical field of microfluidics, and specifically relates to an electroosmotic micropump apparatus and an electroosmotic micropump apparatus group. The electroosmotic micropump apparatus in the present invention comprises fluid micro channels and a microneedle electrode; each fluid micro channel is used for communicating a micro flow channel inlet with a micro flow channel outlet for pumping a fluid; the microneedle elec-
(Continued)

trode comprises a first microneedle type electrode and a second microneedle type electrode that are respectively provided at the micro flow channel inlet and the micro flow channel outlet; the first microneedle type electrode and the second microneedle type electrode are oppositely arranged; moreover, neither of the first microneedle type electrode and the second microneedle type electrode is in conduction with the fluid micro channel. The electroosmotic micropump apparatus of the present invention can provide a parallel and uniform electric field for the interior of the fluid micro channel and generate a stable electroosmotic driving force, and can solve the hydrolysis problem of the surface of an electrode, thereby greatly improving the stability of the running of a micropump and prolonging the service life of the micropump.

13 Claims, 3 Drawing Sheets

(56) References Cited

U.S. PATENT DOCUMENTS

| | | | | |
|---|---|---|---|---|
| 7,318,902 | B2 | 1/2008 | Oakey et al. | |
| 7,625,474 | B1 | 12/2009 | Shepodd et al. | |
| 8,252,250 | B2 * | 8/2012 | Posner | F04B 37/10<br>422/50 |
| 8,603,834 | B2 * | 12/2013 | Puleo | B01L 3/502738<br>422/50 |
| 8,680,311 | B2 * | 3/2014 | Jung | C08G 77/388<br>556/425 |
| 2005/0034842 | A1 * | 2/2005 | Huber | F04B 19/006<br>165/80.4 |
| 2017/0144148 | A1 | 5/2017 | Lavrentovich et al. | |

FOREIGN PATENT DOCUMENTS

| | | | |
|---|---|---|---|
| CN | 103816805 | A | 5/2014 |
| CN | 204746344 | U | 11/2015 |
| CN | 205055830 | U | 3/2016 |
| CN | 109529962 | A | 3/2019 |
| CN | 109847817 | A | 6/2019 |
| CN | 110681419 | A | 1/2020 |
| JP | 2010216902 | A | 9/2010 |

OTHER PUBLICATIONS

Chinese Office Action dated Jul. 26, 2016, as issued in corresponding China Patent Application No. 201910860201.1 with English translation, 16 pages.

* cited by examiner

ELECTROOSMOTIC MICROPUMP APPARATUS AND ELECTROOSMOTIC MICROPUMP APPARATUS GROUP

TECHNICAL FIELD

The present disclosure belongs to the technical field of microfluidics, and in particular relates to an electroosmotic micropump device and an electroosmotic micropump device group.

BACKGROUND

This section provides only background information related to the present disclosure, which is not necessarily the prior art.

An electroosmotic micropump is a micro-liquid driven device based on electroosmotic flow phenomenon, which is widely applied in fields such as micro-total analysis, digital microfluidics, chip cooling, and drug delivery. A microelectrode is the key component that determines a driving performance of the electroosmotic micropump, and its fabrication material and integration process have an important influence on the compactness and driving performance of an overall structure of the micropump.

As to most traditional electroosmotic micropumps, a compact design is realized for them by using thin film microelectrodes so as to improve integration level, and such thin film microelectrodes provide an electroosmotically driven electric field for the fluid at the bottom of microchannels through a deposition or sputtering process. However, since such microelectrodes are arranged at the bottom of the microchannels, it is impossible for them to generate an electric field parallel to the microchannels, which greatly reduces the effective utilization of voltage. In recent years, porous thin film microelectrodes have been developed, which are attached in parallel to inlet and outlet surfaces on both sides of porous medium microchannel films to improve the effective utilization of the voltage. However, such porous thin film microelectrodes require precise alignment with the porous medium microchannel films, which is extremely difficult to realize. Due to the differences in pore size and density between the two kinds of films, the microelectrodes will often cover fluid pores of the porous medium microchannel films, thus increasing the resistance at the inlet and outlet and reducing the flow rate.

SUMMARY

An object of the present disclosure is to at least solve the problem of wind wheel vibration during operation. This object is achieved through the following technical solutions.

A first aspect of the present disclosure proposes an electroosmotic micropump device, which includes:

fluid microchannels, which are configured to communicate a micro flow channel inlet and a micro flow channel outlet for pumping fluid; and microneedle electrodes, which include a first microneedle electrode and a second microneedle electrode provided at the micro flow channel inlet and the micro flow channel outlet respectively, in which the first microneedle electrode and the second microneedle electrode are arranged opposite to each other, and neither of the first microneedle electrode and the second microneedle electrode is in conduction with the fluid microchannels.

According to the electroosmotic micropump device of the present disclosure, during an electroosmotic micro-driving process, by simultaneously energizing the first microneedle electrode and the second microneedle electrode, a parallel and uniform electric field can be provided for an interior of the fluid microchannels, so that a stable electroosmotic driving force is generated. At the same time, since neither of the first microneedle electrode and the second microneedle electrode is in conduction with the fluid microchannels, the problem of hydrolysis on an electrode surface can be solved, and the problems such as gas production, high heat production and corrosion of traditional thin film microelectrodes can be eliminated, thereby greatly improving the stability and service life of the micropump's operation.

In addition, the electroosmotic micropump device according to the present disclosure may also have the following additional technical features.

The first microneedle electrode and the second microneedle electrode respectively include a plurality of microneedles arranged in parallel, and the plurality of microneedles are respectively arranged opposite to the fluid microchannels.

In some embodiments of the present disclosure, the first microneedle electrode and the second microneedle electrode respectively include a plurality of microneedles arranged in parallel, and the plurality of microneedles are respectively arranged on both sides of the fluid microchannels.

In some embodiments of the present disclosure, the microneedle electrode further includes a substrate, the plurality of microneedles are arranged in parallel on the substrate, and the substrate is connected to a power source.

In some embodiments of the present disclosure, needle tips of the plurality of microneedles are respectively flush with bottom surfaces of the fluid microchannels.

In some embodiments of the present disclosure, the microneedles have a conical shape or a polyhedral triangular pyramid shape.

In some embodiments of the present disclosure, surfaces of the microneedle electrodes are coated with a waterproof material.

Another aspect of the present disclosure further provides an electroosmotic micropump device group, which includes at least two electroosmotic micropump devices described above.

In some embodiments of the present disclosure, any one of the electroosmotic micropump devices in the electroosmotic micropump device group includes the microneedle electrodes and substrates arranged corresponding to the microneedle electrodes.

In some embodiments of the present disclosure, any one of the electroosmotic micropump devices in the electroosmotic micropump device group includes microneedle electrodes, substrates are provided between the adjacent electroosmotic micropump devices, and the substrates can be connected to the microneedle electrodes in any one of the electroosmotic micropump devices at the same time.

BRIEF DESCRIPTION OF THE DRAWINGS

Upon reading the detailed description of the preferred embodiments below, various other advantages and benefits will become clear to those skilled in the art. The accompanying drawings are only used for the purpose of illustrating preferred embodiments, and should not be considered as a limitation to the present disclosure. Moreover, throughout the drawings, the same reference numerals are used to denote the same components, in which.

Figure 1:
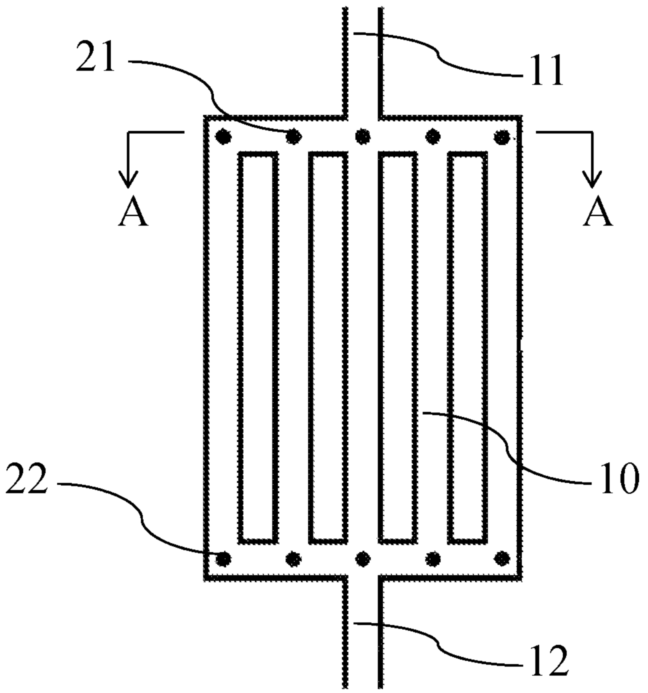
FIG. 1 is a schematic front structural view of an electroosmotic micropump device according to an embodiment of the present disclosure.

The reference signs in the accompanying drawings are listed as follows:

10: fluid microchannel; 11: micro flow channel inlet; 12: micro flow channel outlet;

21: first microneedle electrode; 211: microneedle; 212: substrate; 22: second microneedle electrode.

DETAILED DESCRIPTION

Hereinafter, exemplary embodiments of the present disclosure will be described in more detail with reference to the accompanying drawings. Although the exemplary embodiments of the present disclosure are shown in the drawings, it should be understood that the present disclosure may be implemented in various forms and should not be limited by the embodiments set forth herein. On the contrary, these embodiments are provided to enable a more thorough understanding of the present disclosure and to fully convey the scope of the present disclosure to those skilled in the art.

It should be understood that the terms used herein are only for the purpose of describing specific exemplary embodiments, and are not intended to be limitative. Unless clearly indicated otherwise in the context, singular forms "a", "an", and "said" as used herein may also mean that plural forms are included. Terms "include", "comprise", "contain" and "have" are inclusive, and therefore indicate the existence of the stated features, steps, operations, elements and/or components, but do not exclude the existence or addition of one or more other features, steps, operations, elements, components, and/or combinations thereof. The method steps, processes, and operations described herein should not be interpreted as requiring them to be executed in the specific order described or illustrated, unless the order of execution is clearly indicated. It should also be understood that additional or alternative steps may be used.

Although terms "first", "second", "third" and the like may be used herein to describe multiple elements, components, regions, layers and/or sections, these elements, components, regions, layers and/or sections should not be limited by these terms. These terms may only be used to distinguish one element, component, region, layer or section from another region, layer or section. Unless clearly indicated in the context, terms such as "first", "second" and other numerical terms do not imply an order or sequence when they are used herein. Therefore, the first element, component, region, layer or section discussed below may be referred to as a second element, component, region, layer or section without departing from the teachings of the exemplary embodiments.

For ease of description, spatial relative terms may be used herein to describe the relationship of one element or feature relative to another element or feature as shown in the drawings. These relative terms are, for example, "inner", "outer", "inside", "outside", "below", "under", "above", "over", etc. These spatial relative terms are intended to include different orientations of the device in use or in operation in addition to the orientation depicted in the drawings. For example, if the device in the figure is turned over, then elements described as "below other elements or features" or "under other elements or features" will be oriented as "above the other elements or features" or "over the other elements or features". Thus, the exemplary term "below" may include orientations of both above and below. The device can be otherwise oriented (rotated by 90 degrees or in other directions), and the spatial relationship descriptors used herein will be explained accordingly.

Figure 2:
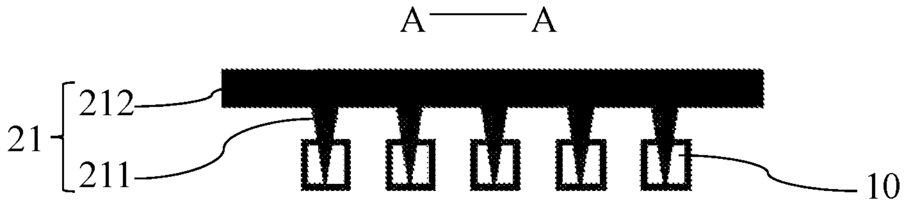
FIG. 2 is a schematic cross-sectional structural view at a first microneedle electrode in FIG. 1 taken along line A-A.

FIG. 1 is a schematic front structural view of an electroosmotic micropump device according to an embodiment of the present disclosure. FIG. 2 is a schematic cross-sectional structural view at a first microneedle electrode in FIG. 1 taken along line A-A. A first aspect of the present disclosure proposes an electroosmotic micropump device, which includes fluid microchannels 10 and microneedle electrodes.

The fluid microchannels 10 are configured to communicate a micro flow channel inlet 11 and a micro flow channel outlet 12 for pumping fluid.

The microneedle electrodes include a first microneedle electrode 21 and a second microneedle electrode 22, which are respectively provided at the micro flow channel inlet 11 and the micro flow channel outlet 12. The first microneedle electrode 21 and the second microneedle electrode 22 are arranged opposite to each other, and neither of the first microneedle electrode 21 and the second microneedle electrode 22 is in conduction with the fluid microchannels 10.

According to the electroosmotic micropump device of the present disclosure, during an electroosmotic micro-driving process, by simultaneously energizing the first microneedle electrode 21 and the second microneedle electrode 22, a parallel and uniform electric field can be provided for an interior of the fluid microchannels 10, so that a stable electroosmotic driving force is generated. At the same time, since neither of the first microneedle electrode 21 and the second microneedle electrode 22 is in conduction with the fluid microchannels 10, the problem of hydrolysis on an electrode surface can be solved, and the problems such as gas production, high heat production and corrosion of traditional thin film microelectrodes can be eliminated, thereby greatly improving the stability and service life of the micropump.

The fluid microchannels 10 may be integrally formed with the micro flow channel as a part of the micro flow channel, or structures such as baffles may also be arranged in the micro flow channel to divide the interior of the micro flow channel into a plurality of fluid microchannels arranged in parallel with each other. The first microneedle electrode 21 and the second microneedle electrode 22 are arranged at the inlet and outlet of the plurality of fluid microchannels 10 respectively, namely, the micro flow channel inlet 11 and the micro flow channel outlet 12. When a voltage is applied to the first microneedle electrode 21 and the second microneedle electrode 22, parallel and uniform electric field lines are generated in the parallel fluid microchannels 10, thereby generating an electroosmotic driving force on wall surfaces of the fluid microchannels 10 to drive the liquid in the entire fluid microchannels 10. The electroosmotically driven flow rate and direction are determined by the magnitude and direction of the applied voltage. In order to maximally ensure that parallel and uniform electric field lines are generated in the fluid microchannels 10, the first microneedle electrode 21 and the second microneedle electrode 22 are arranged perpendicular to the fluid microchannels 10.

As shown in FIG. 1 and FIG. 2, in some embodiments of the present disclosure, the first microneedle electrode 21 and the second microneedle electrode 22 respectively include a plurality of microneedles 211 arranged in parallel, and the plurality of microneedles 211 are respectively arranged opposite to the fluid microchannels 10. The microneedles 211 are connected to positive and negative poles of the voltage through a substrate 212. The plurality of microneedles 211 are arranged in parallel on the substrate 212, and the substrate 212 is connected to a power source. When a voltage is applied to the first microneedle electrode 21 and the second microneedle electrode 22, an electroosmotically driven fluid flow is generated on the wall surfaces of the fluid microchannels 10. Since the microneedle 211 on the microneedle electrode has an equivalent cross-sectional size as the fluid microchannel 10, and the two are arranged right perpendicular to each other, a uniform electric field parallel to the fluid microchannels 10 can be formed in the fluid microchannels 10, so a uniform and stable driving performance can be achieved for the micropump.

The fluid microchannels are fabricated by a Micro-Electro-Mechanical System (MEMS) micromachining process, and the number of the fluid microchannels 10 arranged in parallel is plural. The size of a gap between the fluid microchannels 10 arranged in parallel is of the order of micron, submicron and nano.

In addition, the material for fabricating the fluid microchannels 10 is parylene, or polyimide, or polyurethane, or polytetrafluoroethylene, or silica gel, or glass or silica, etc.

In addition, a cross-section of the fluid microchannels 10 is any one of rectangle, circle, or triangle.

In addition, the material for fabricating the microneedle electrodes is a metal such as platinum, or gold, or platinum-iridium, or tantalum, or nickel, or titanium, or copper or stainless steel, or silicon or dioxide or glass or polymer and the like, a surface of which is coated with at least one of the above metals, a thickness of the metal coating being of the order of nano.

In order to isolate the metals on the microneedle electrodes from direct contact with the fluid in the fluid microchannels 10, which would otherwise cause problems of gas and heat production on the wall surfaces and cause electrode corrosion, the surfaces of the microneedle electrodes are coated with a layer of waterproof material. In addition, the waterproof material is parylene, or polyimide, etc., and the thickness of the waterproof coating is of the order of nano. Therefore, the microneedle electrodes are isolated from the fluid in the fluid microchannels by the waterproof material, which eliminates the problems such as gas production, heat production and corrosion of traditional thin film microelectrodes, and greatly improves the stability and service life of the micropump's operation.

In addition, the microneedles may be designed into a conical shape or a polyhedral triangular pyramid shape, etc., so as to ensure that flowing of the fluid will not be hindered while an electroosmotically driven fluid flow is generated on the wall surfaces of the fluid microchannels 10.

In some embodiments of the present disclosure, needle tips of the plurality of microneedles are respectively flush with bottom surfaces of the fluid microchannels 10, so as to achieve a maximum driving force.

Figure 3:
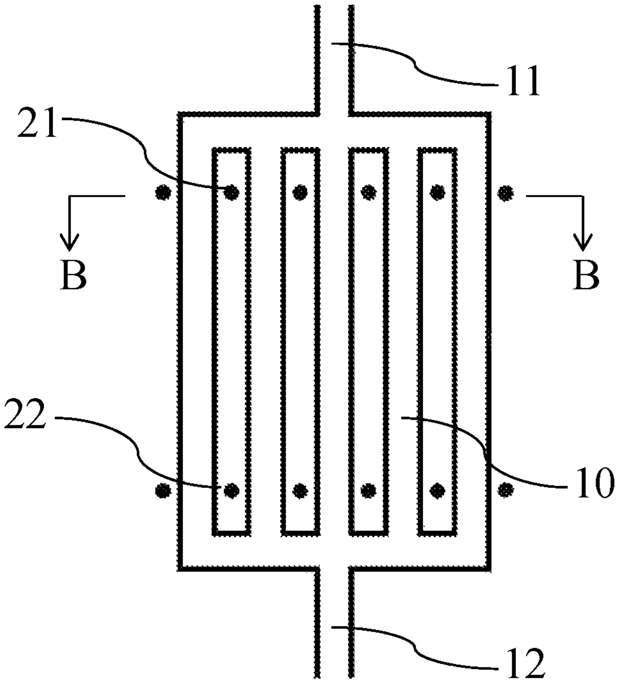
FIG. 3 is a schematic front structural view of an electroosmotic micropump device according to another embodiment of the present disclosure.
Figure 4:
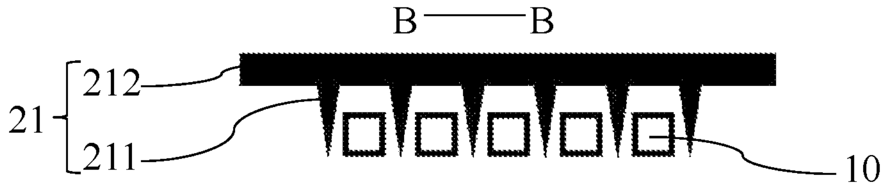
FIG. 4 is a schematic cross-sectional structural view at a first microneedle electrode in FIG. 3 taken along line B-B.

FIG. 3 is a schematic front structural view of an electroosmotic micropump device according to another embodiment of the present disclosure. FIG. 4 is a schematic cross-sectional structural view at a first microneedle electrode in FIG. 3 taken along line B-B. As shown in FIG. 3 and FIG. 4, in some embodiments of the present disclosure, the first microneedle electrode 21 and the second microneedle electrode 22 respectively include a plurality of microneedles 211 arranged in parallel, and the plurality of microneedles 211 are respectively arranged on both sides of the fluid microchannels 10. Since the microneedles 211 on the microneedle electrodes are closely arranged on both sides of the fluid microchannels 10, and the gap between the two is of the order of nano or submicron and the two are kept perpendicular to each other, a nearly parallel and uniform electric field can also be formed in the fluid microchannels 10, and a uniform and stable driving performance can also be achieved for the micropump.

Another aspect of the present disclosure further provides an electroosmotic micropump device group, which includes at least two electroosmotic micropump devices in the above embodiments. By attaching and stacking a plurality of electroosmotic micropump devices, a multi-layer electroosmotic micropump device is formed by integration, so as to obtain an integrated electroosmotic micropump device having a flow rate increased by multiple times.

Figure 5:
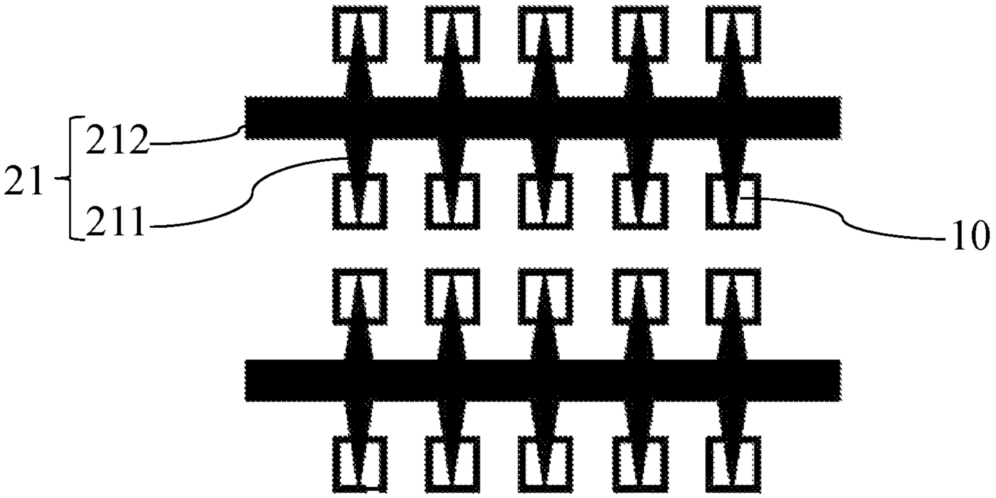
FIG. 5 is a schematic cross-sectional structural view at a first microneedle electrode in another embodiment of the present disclosure.

FIG. 5 is a schematic cross-sectional structural view at a first microneedle electrode in another embodiment of the present disclosure. As shown in FIG. 5, in some embodiments of the present disclosure, the electroosmotic micropump device group includes a four-layer electroosmotic micropump device. As shown in FIG. 5, the positions in the figure are a first layer, a second layer, a third layer and a fourth layer in sequence from top to bottom. A substrate is arranged between the first layer and the second layer, a substrate 212 is arranged between the third layer and the fourth layer, and the substrate 212 is connected to the microneedles 211 in any adjacent electroosmotic micropump devices at the same time, thus forming a form of dual-surface microneedles, so that the arrangement of the substrates 212 is reduced, a flow-through area of the fluid in the fluid microchannels 10 is increased, and the flow rate of the fluid is increased. At the same time, comparing the second layer and the third layer, the second layer and the third layer are respectively provided with the microneedles 211 and the substrate 212 connected to the microneedles 211, and the plurality of microneedles 211 are arranged opposite to each other, thereby increasing the intensity of the electric field and improving the flowing velocity of the fluid in the fluidic microchannels.

Figure 6:
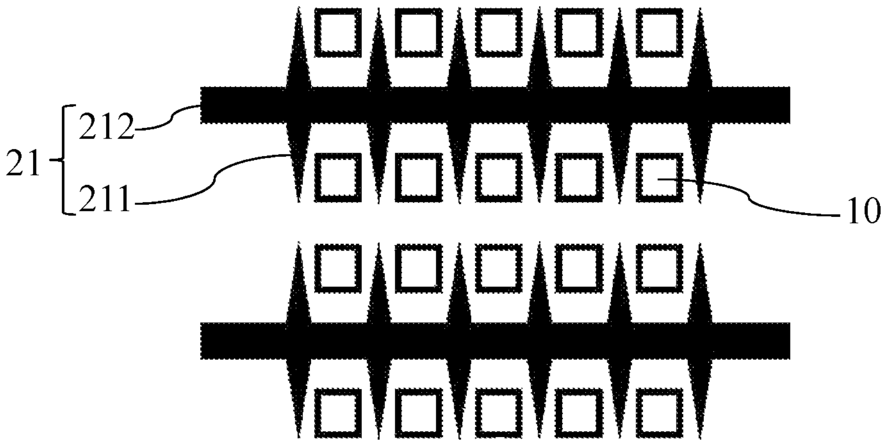
FIG. 6 is a schematic cross-sectional structural view at a first microneedle electrode in another embodiment of the present disclosure.

FIG. 6 is a schematic cross-sectional structural view at a first microneedle electrode in another embodiment of the present disclosure. As shown in FIG. 6, the interconnection form of the plurality of electroosmotic micropump devices in FIG. 6 is the same as that of the plurality of electroosmotic micropump devices in FIG. 5, only except for that the arrangement of the microneedles 211 and the fluid microchannels 10 in the electroosmotic micropump devices in FIG. 6 is inconsistent with that of FIG. 5. The electroosmotic micropump device group in FIG. 6 has the same effect as the electroosmotic micropump device group in FIG. 5, and it can also obtain an integrated micropump having a flow rate increased by multiple times.

Described above are only preferred specific embodiments of the present disclosure, but the scope of protection of the present disclosure is not limited thereto. Any change or replacement that can be easily conceived by those skilled in the art within the technical scope disclosed in the present disclosure shall be covered within the scope of protection of the present disclosure. Therefore, the scope of protection of the present disclosure shall be subject to the scope of protection of the claims.

The invention claimed is:

1. An electroosmotic micropump device, comprising:

fluid microchannels, which are configured to communicate a micro flow channel inlet and a micro flow channel outlet for pumping fluid; and microneedle electrodes, which comprise a first microneedle electrode and a second microneedle electrode provided at the micro flow channel inlet and the micro flow channel outlet respectively, wherein the first microneedle electrode and the second microneedle electrode are arranged opposite to each other, and neither of the first microneedle electrode and the second microneedle electrode is in conduction with the fluid microchannels.

2. The electroosmotic micropump device according to claim 1, wherein the first microneedle electrode and the second microneedle electrode respectively comprise a plurality of microneedles arranged in parallel, and the plurality of microneedles are respectively arranged opposite to the fluid microchannels.

3. The electroosmotic micropump device according to claim 1, wherein the first microneedle electrode and the second microneedle electrode respectively comprise a plurality of microneedles arranged in parallel, and the plurality of microneedles are respectively arranged on both sides of the fluid microchannels.

4. The electroosmotic micropump device according to claim 2, wherein the microneedle electrode further comprises a substrate, the plurality of microneedles are arranged in parallel on the substrate, and the substrate is connected to a power source.

5. The electroosmotic micropump device according to claim 2, wherein needle tips of the plurality of microneedles are respectively flush with bottom surfaces of the fluid microchannels.

6. The electroosmotic micropump device according to claim 2, wherein the microneedles have a conical shape or a polyhedral triangular pyramid shape.

7. The electroosmotic micropump device according to claim 1, wherein surfaces of the microneedle electrodes are coated with a waterproof material.

8. An electroosmotic micropump device group, comprising at least two electroosmotic micropump devices according to claim 1.

9. The electroosmotic micropump device group according to claim 8, wherein any one of the electroosmotic micropump devices in the electroosmotic micropump device group comprises the microneedle electrodes and substrates arranged corresponding to the microneedle electrodes.

10. The electroosmotic micropump device group according to claim 8, wherein any one of the electroosmotic micropump devices in the electroosmotic micropump device group comprises microneedle electrodes, substrates are provided between the adjacent electroosmotic micropump devices, and the substrates can be connected to the microneedle electrodes in any one of the electroosmotic micropump devices at the same time.

11. The electroosmotic micropump device according to claim 3, wherein the microneedle electrode further comprises a substrate, the plurality of microneedles are arranged in parallel on the substrate, and the substrate is connected to a power source.

12. The electroosmotic micropump device according to claim 3, wherein needle tips of the plurality of microneedles are respectively flush with bottom surfaces of the fluid microchannels.

13. The electroosmotic micropump device according to claim 3, wherein the microneedles have a conical shape or a polyhedral triangular pyramid shape.

* * * * *